Feb. 3, 1931.  C. W. EYRES  1,791,302
ENSILAGE MACHINE
Filed March 31, 1927  7 Sheets-Sheet 1
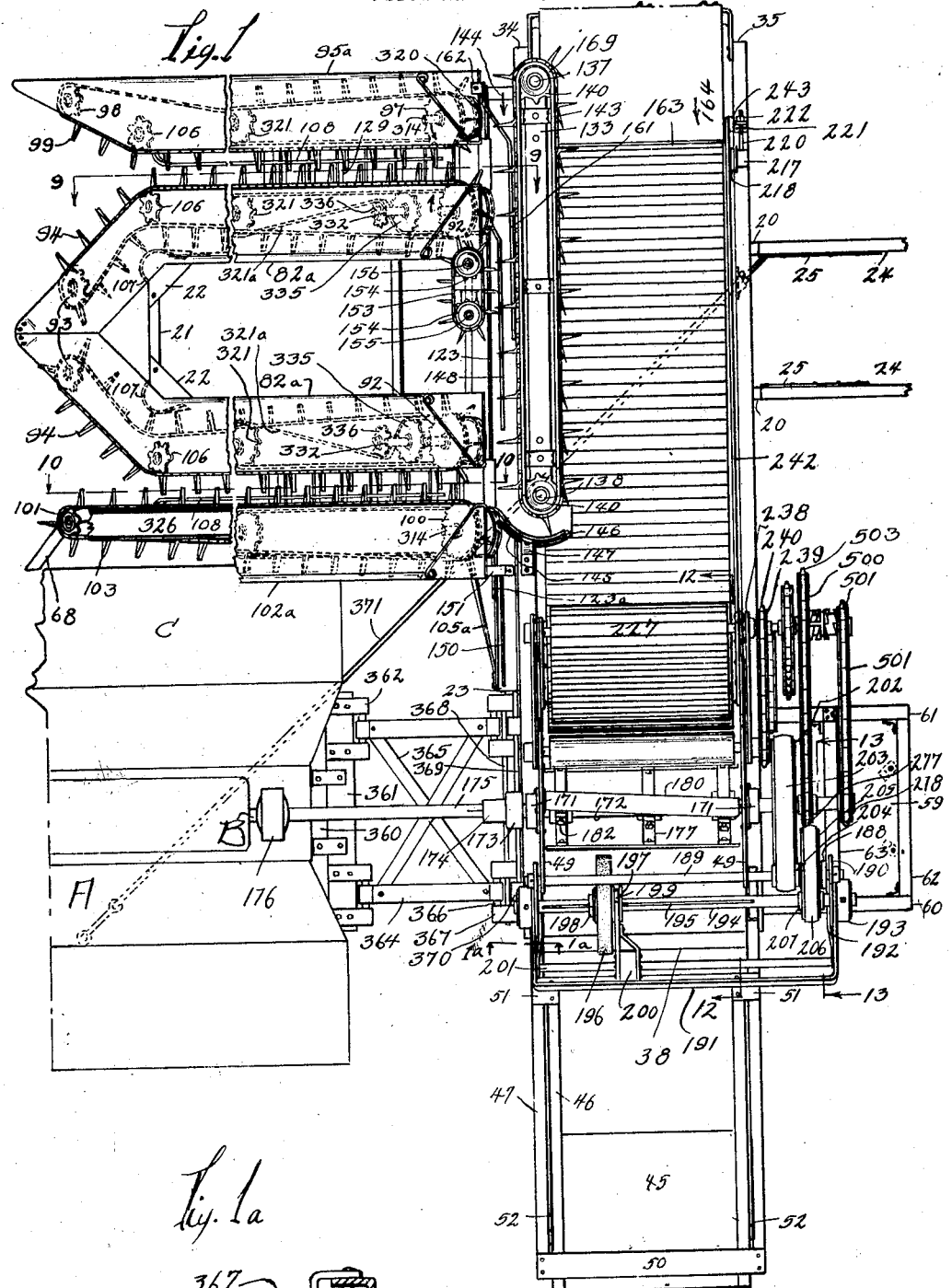
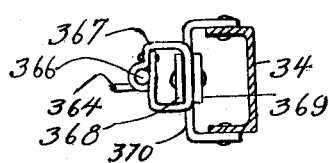
Inventor
Charles W. Eyres
By Lynn H. Latta  Attorney Feb. 3, 1931.  C. W. EYRES  1,791,302
ENSILAGE MACHINE
Filed March 31, 1927   7 Sheets-Sheet 2
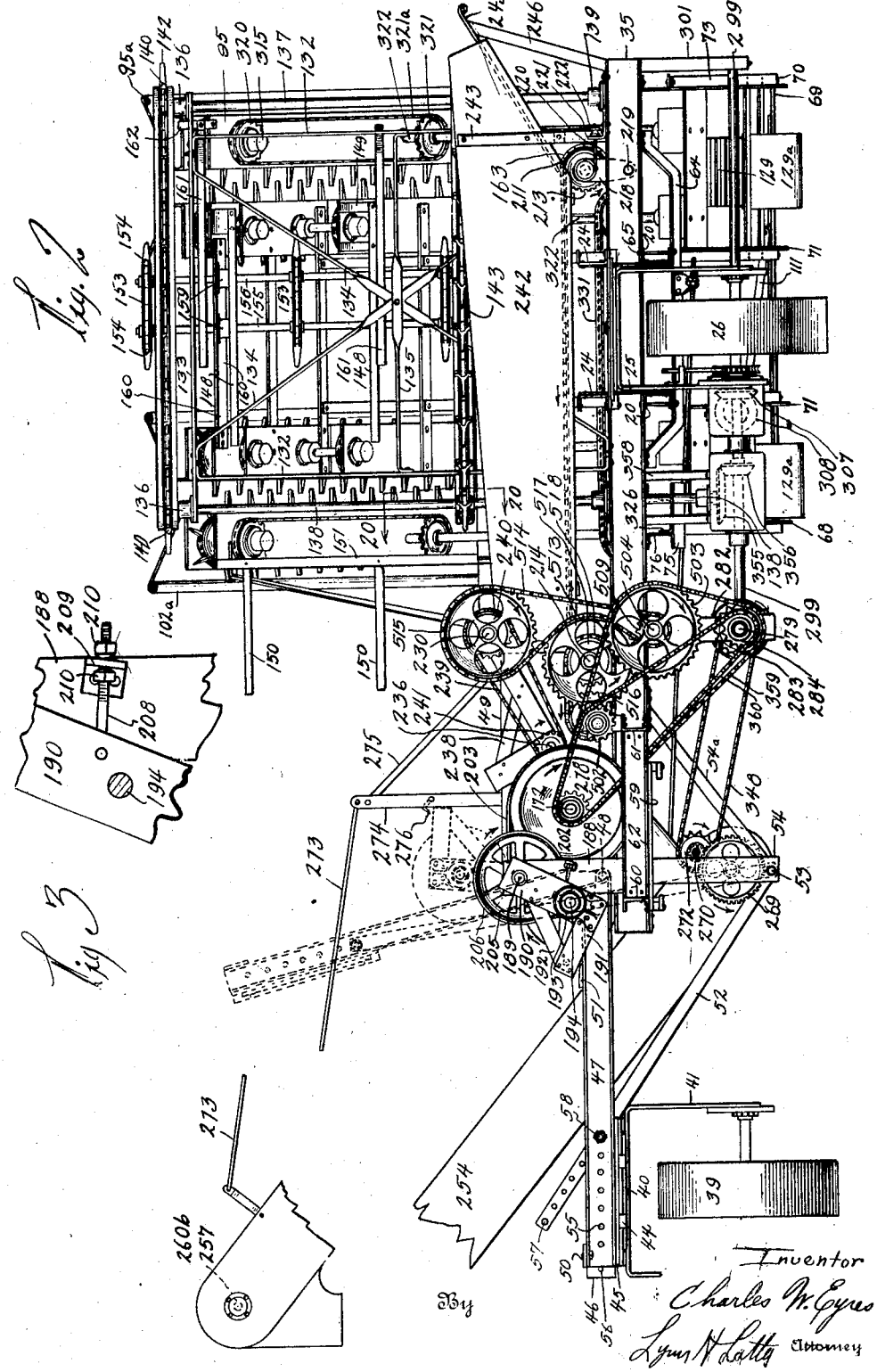

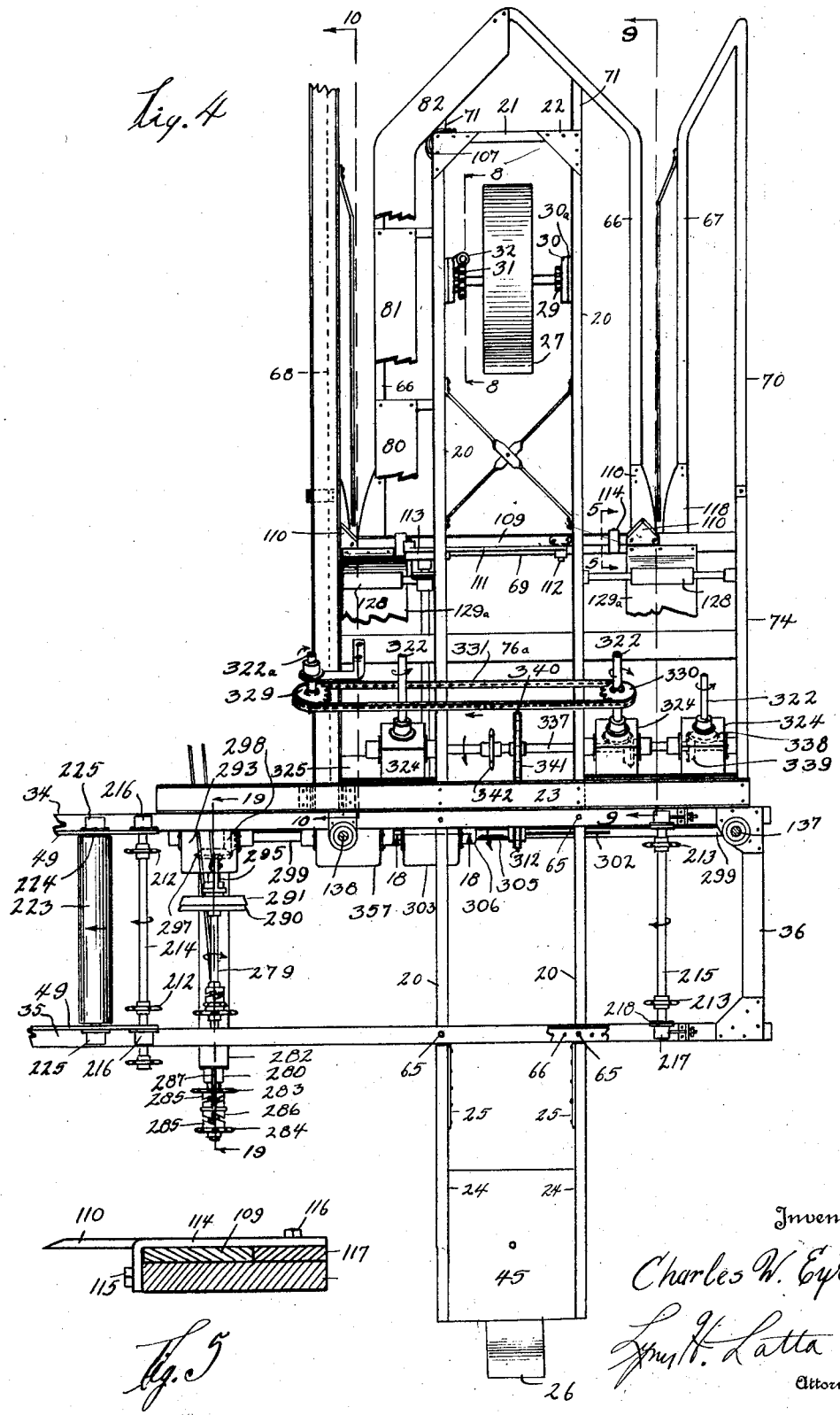

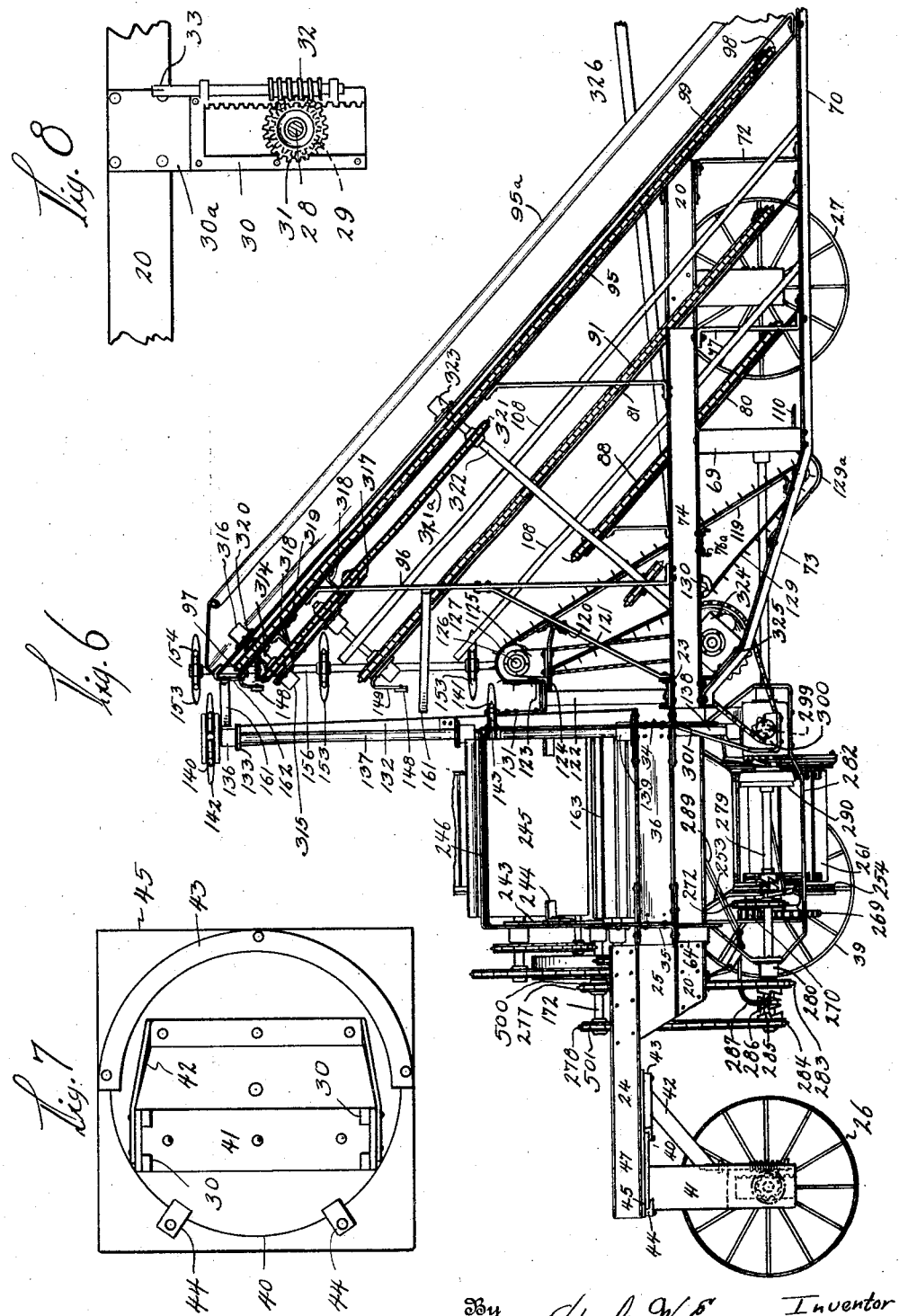

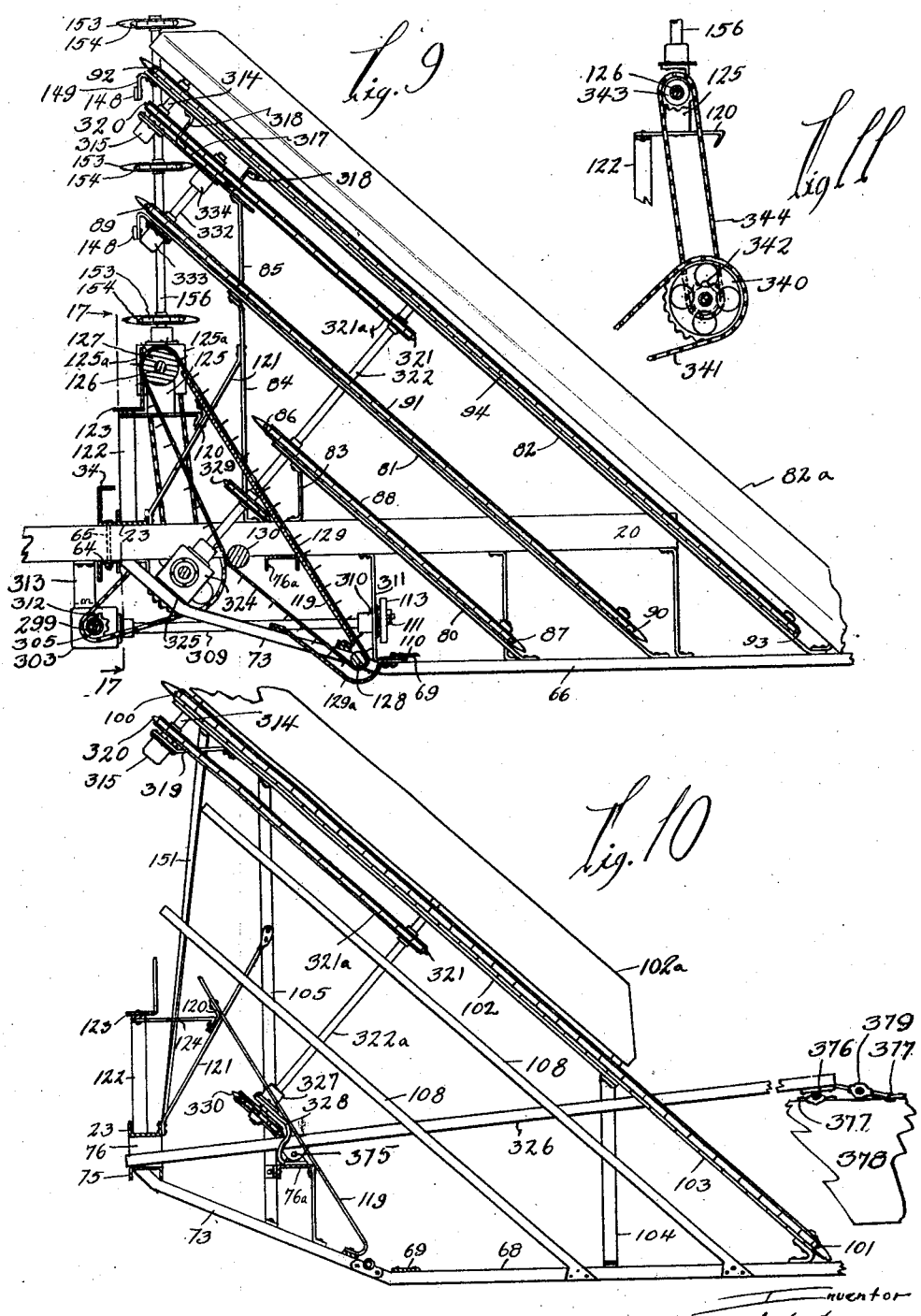

Feb. 3, 1931.　　　C. W. EYRES　　　1,791,302
ENSILAGE MACHINE
Filed March 31, 1927　　　7 Sheets-Sheet 6
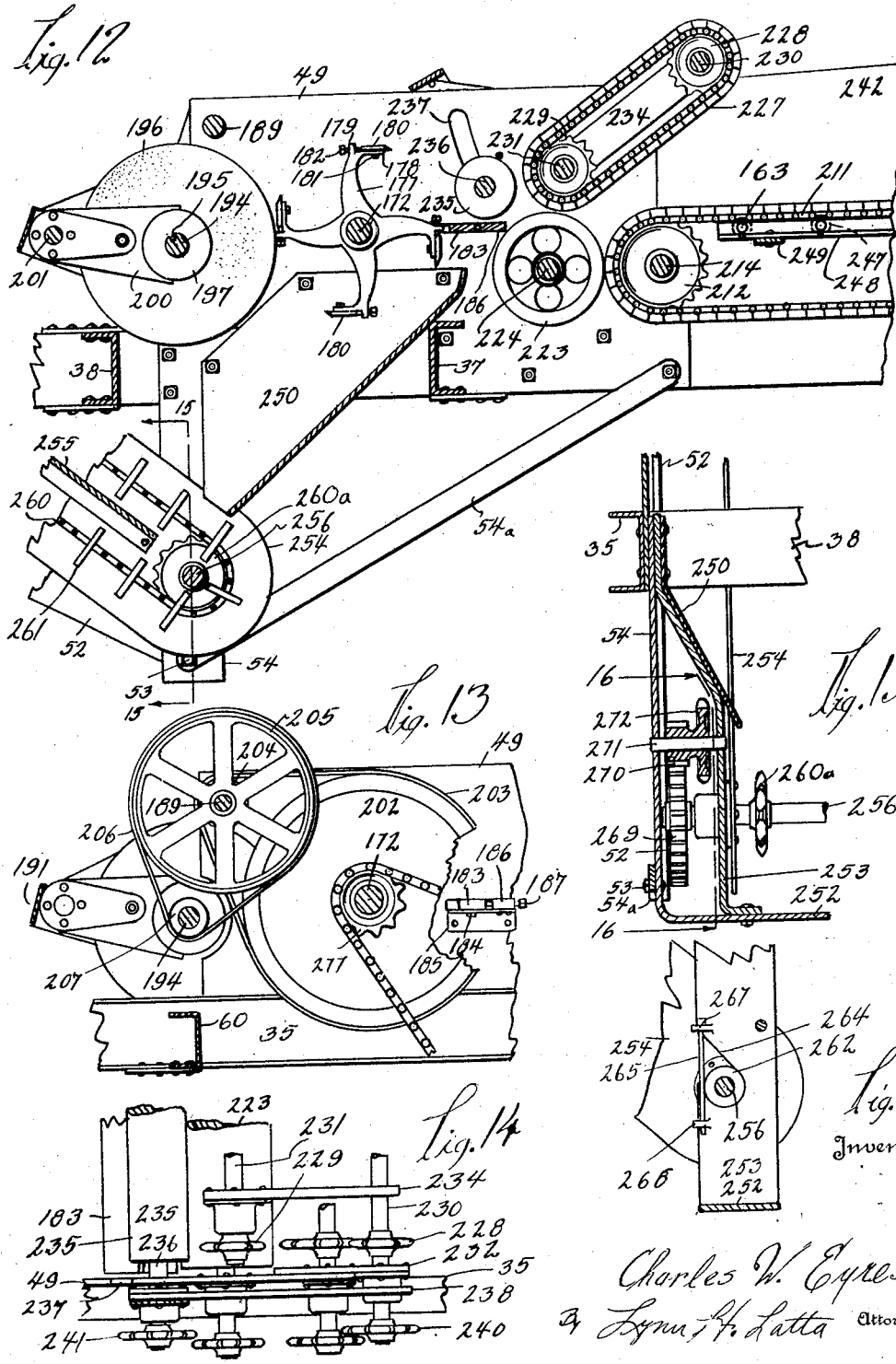

Feb. 3, 1931.　　　C. W. EYRES　　　1,791,302
ENSILAGE MACHINE
Filed March 31, 1927　　7 Sheets-Sheet 7

Inventor
Charles W. Eyres
By Lynn A. Latta Attorney

Patented Feb. 3, 1931

1,791,302

UNITED STATES PATENT OFFICE

CHARLES W. EYRES, OF LE MARS, IOWA

ENSILAGE MACHINE

Application filed March 31, 1927. Serial No. 179,876.

My invention relates to ensilage machines and it is my object to provide an ensilage gathering and cutting machine adapted to operate on two rows of corn or fodder simultaneously.

A further object of the invention is to provide such an ensilage machine which has means for attaching it behind a tractor and for propelling all of its moving parts directly from a power unit supported upon the tractor.

Another object of my invention is to provide such an ensilage machine which is adjustable for varying widths of tractors.

My invention further has for its aim to so relate the driving mechanism or the cutter and the gathering mechanism, respectively, so that the change from one width to another may be effected without necessitating the alteration of the driving mechanism.

The above objects are attained in a general way by providing two frames, one for the cutting mechanism and one for the gathering mechanism, each of these frames being relatively long and narrow and crossing each other at right angles, the gathering frame being slidable relative to the cutter frame and a pair of parallel shafts on the respective frames serving to transmit power from one to the other by means of a sprocket and chain connection, the sprocket on one of the shafts being slidable as the frames are moved relative to each other.

Another object of my invention is to provide means for transferring the fodder from the gathering mechanism to a reclining position at right angles to the direction of motion of the gathering mechanism upon a feeding apron carried by the cutter frame.

Another object of my invention is to provide a built-in grinding unit, driven from the same source of power as the cutter and used for the purpose of sharpening the cutter blades without removing them from the machine.

Another object of the invention is to arrange the elevator of the cutter so that it can be instantly removed and packed upon the cutter frame so as to decrease the width of the machine during transportation.

Another object is to provide means for shifting the position of the outer travel wheel during transportation for the purpose of decreasing the width of the machine.

Another object is to provide a flexible draft hitch for connecting the machine to a tractor.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1a is a detail view of a portion of the hitch, taken on the line 1a—1a of Fig. 1.

Fig. 1 is a plan view of the machine hitched to a tractor, parts being broken away and omitted.

Fig. 2 is a rear elevation of the machine and tractor, a portion of the elevator being omitted.

Fig. 3 is a fragmentary view, illustrating the adjusting device for the grinder frame.

Fig. 4 is a plan view of the frame of the machine, a portion of the tractor being shown and the super-structure being removed to better illustrate the main frame elements and driving mechanism.

Fig. 5 is a detail, sectional view through the sickle base bar, taken on the line 5—5 of Fig. 4.

Fig. 6 is a right side elevation of the machine, the tractor being omitted.

Fig. 7 is an inverted plan view of a caster wheel mounting.

Fig. 8 is a detail, sectional view taken on the line 8—8 of Fig. 4 and illustrating the front wheel raising mechanism.

Fig. 9 is a sectional view taken on the line 9—9 of Fig. 1 or 4 and illustrating one of the inner gathering arms.

Fig. 10 is a sectional view, taken on the line 10—10 of Fig. 1 or 4, illustrating the left outer gathering arm.

Fig. 11 is a detail, sectional view, illustrating the drives to the auxiliary conveyor and connecting shaft for transmitting power.

Fig. 12 is a detail, sectional view, taken on the line 12—12 of Fig. 1, illustrating the cutter mechanism.

Fig. 13 is a sectional view, showing the grinder drive, taken on the line 13—13 of Fig. 1.

Fig. 14 is a plan view, showing the floating feed apron frame drive sprockets and adjacent parts.

Fig. 15 is a detail, sectional view, taken on the line 15—15 of Fig. 12.

Fig. 16 is a detail, sectional view, taken on the line 16—16 of Fig. 15.

Figures 17, 18:
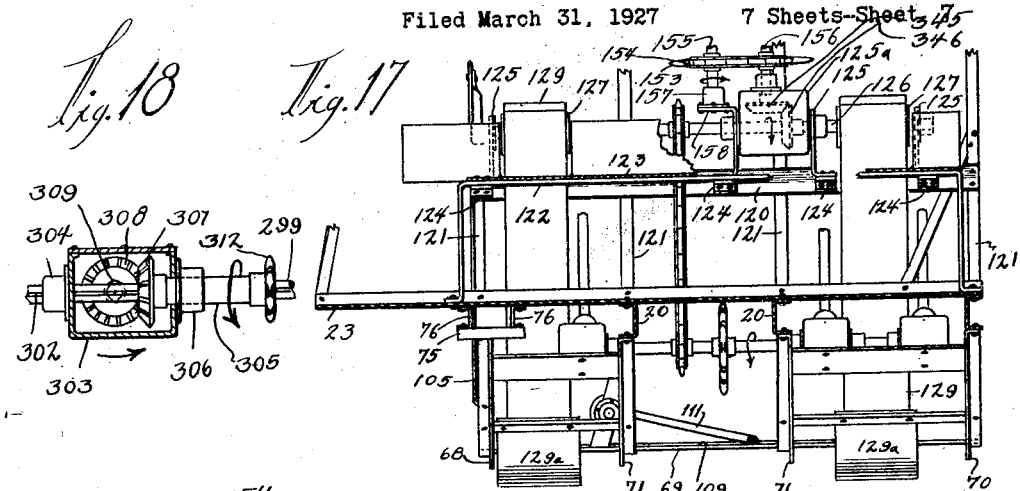
Fig. 17 is a detail, sectional view, taken on the line 17—17 of Fig. 9.
Fig. 18 is a detail, sectional view, taken on the line 18—18 of Fig. 4.

As indicated in the objects, the ensilage machine of my invention comprises generally a gathering unit and a cutting unit. The direction of the corn in traveling through the cutting unit is changed and made at right angles to its direction when passing through the gathering unit. This gives in general an L shaped machine and obtains the advantage of grouping the mechanism around the tractor which pulls the machine and which is seated between the arms of the L so that all portions of the machine are as near as possible to the operator. It has the added advantage of positioning the gathering mechanism to one side of the operator so that he may very clearly see the relative positions of the rows of fodder and the gathering arms. With the gathering mechanism thus positioned at the side of the tractor, the extending of the cutting mechanism behind the tractor balances the pull of the machine so as to reduce the side draft which would otherwise be caused by the gathering mechanism.

With these general features of the machine in mind, I will proceed to a detailed description of the

Frame

A pair of longitudinal rails 20 form the foundation of the gathering frame. The rails 20 are connected together at their forward ends by a cross bar 21 and gusset plates 22 and near their rear ends they are secured by a transverse channel 23 (see Fig. 4). At their rear ends, the rails 20 are elevated or secured to a pair of stub rails 24 by means of connecting plates 25 (Fig. 6). The elevation of the portions 24 is for the purpose of receiving the frame of a caster wheel 26 which supports the rear end of the gathering frame. A detailed construction of the caster wheel and its mounting will be hereinafter set forth.

The forward extremity of the frame is supported by a forward travel wheel 27, journalled on a shaft 28, which carries the pinions 29, engaged with racks 30, supported by the wheel brackets 30a, secured to the rails 20 as shown in Figs. 4 and 8. A worm wheel 31, secured to the shaft 28, is operated by a worm 32, carried by one of the wheel brackets 30a. Rotation of the worm 32, by means of a crank, applied to the squared end 33 of the worm shaft, causes the shaft 38 to be rotated and the pinions 29 to travel vertically in the racks 30. The construction just described serves to raise and lower the travel wheel relative to the frame.

The cutter frame comprises the parallel, transverse rails 34 and 35, secured together at one end by a cross bar 36 and at the other end by cross bars 37 and 38 (Fig. 12). One end of this frame is supported upon the gathering frame and the other end is supported by a caster wheel 39 similar to the wheel 26. Each of the caster wheels 26 and 39 include a frame comprising a ring 40 and wheel brackets 41 projecting downwardly from one side of the ring and braced thereto by diagonal braces 42, (Figs. 6, 7, 8, and 2), the brackets 41 supporting the wheels through the medium of vertically adjusting mechanism, identical with that described, with reference to the forward travel wheel 27. The rings 40 are journalled at their peripheries in semicircular guides 43 and removable guide fingers 44, (Fig. 7). Removal of the fingers 44 allows the rings 40 to be detached from their sockets. The guides 43 and fingers 44 are secured to supporting plates 45, which in turn are secured to the stub rails 24 and to the extension rails 46 of the transverse frame, respectively (Figs. 1 and 2). The extension rails 46 are telescopically mounted between swinging rails 47, which in turn are pivoted at 48 to plates 49, secured to the rails 34 and 35, respectively, and extending upwardly to house the cutting mechanism which will hereinafter be described.

A cross bar 50 secures the ends of the swinging rails 47 together and supports the ends of the rails against the extension rails 46 (Fig. 1). Plates 51 are secured to the inner ends of the extension rails 46 and extend over the swinging rails 47 to support the extension rails relative to the swinging rails. It will now be seen that the rails 46 may be extended outwardly to adjust the position of the wheel 39 longitudinally of the cutter frame. A pair of swinging braces 52 are pivoted at 53 to brackets 54 supported from the rails 34 and 35, respectively, and extend diagonally outwardly and upwardly between the rails 46 and 47, respectively (Fig. 2). A number of openings 55, 56 and 57 in the rails 47, 46 and braces 52, respectively, are adapted to register in any of several relative positions of the rails 46 and 47, respectively, and to receive bolts 58 for securing the rails together and to the braces 52. The bolts 58 thus serve the double purpose of securing the rails against longitudinal movement and securing them to the braces which prevent vertical movement.

During transportation of the machine, the travel wheel 39 is removed from its socket at the ends of the extension rails, and mounted in a similar socket 59, (Figs. 1 and 2), secured to an auxiliary frame comprising the members 60 and 61, secured to and projecting from the outer side of the rail 35 and the cross members 62 and 63, respectively. The socket 59 being positioned lower than the normal socket, the travel wheel 39 will be adjusted as close as possible to its supporting frame before insertion in the socket 59.

The rails 47 may then be swung upwardly to very nearly vertical position and secured in that position by the braces 52. (See dotted line position illustrated in Fig. 2.)

The general construction of the two frames having been described, it will now be seen that the position of the gathering mechanism may be shifted relative to the cutter frame. The purpose of so shifting the gathering mechanism is to accommodate the machine to tractors of various makes. Tractors are built in varying widths and many of them are provided with a longitudinal power take-off shaft. Such a tractor is indicated generally at A in Fig. 1, the take-off shaft being referred to by the reference character B. The cutting mechanism, which will later be described, is to be connected directly to the power take-off shaft B or an extension thereof and therefore aligned directly behind the shaft. Consequently the position of the transverse or cutter frame is determined by the position of the power take-off shaft and the position of the gathering mechanism will be determined by placing it as close as possible to the right wheel or fender of the tractor which is indicated at C in Fig. 1. Since tractors are of varying widths and the power take-off shafts are sometimes positioned in the center and sometimes to one side of the tractor, it will be seen that the distance between the outer extremity of the right wheel and the power take-off shaft, which determines the relative positions of cutter frame and gathering mechanism, will vary. It is further necessary to take into consideration the travel of the tractor wheels between the corn rows and in some cases where the gathering mechanism, being correctly positioned relative to the corn rows, the tractor is of such width that to position it closely adjacent the gathering mechanism would cause it to cut down a row of corn, the gathering mechanism may have to be extended a considerable distance in order to obtain the proper register of both gathering mechanism and tractor with the corn rows.

In order to provide a slidable connection between the two frames and yet brace them as much as possible against twisting, the longitudinal frame is mounted between the cutter frame and a pair of truss bars 64, which are secured to the lower flanges of the rails 34 and 35, respectively, as clearly shown in Figs. 2 and 9. Bolts 65 are extended through the flanges of the rails 34 and 35, respectively, thence through the flanges of the longitudinal rails 20 and thence through the flanges of the truss bars 64. There are four of the bolts 65 and a plurality of openings 66 in the rails 34 and 35 and the trusses 64 to receive the bolts in any of several positions of the longitudinal frame. The relative positions of the two frames may be quickly changed by removing the four bolts.

The gathering mechanism embodies a super-structure built upon the longitudinal frame ahead of the transverse frame and entirely unconnected with the latter. This super-structure embodies generally the gathering frame skeleton comprising the longitudinal, spaced bars 66, 67 and 68 (Fig. 4). The bars 66, 67 and 68 are secured at their rear ends to the sickle base bar 69, the bars 66 are secured together at their forward ends, and the bar 67 is bent back upon itself as at 70 and again secured to the base bar 69. Sub-rails 71 are positioned directly below the rails 20 and suspended therefrom by means of brackets 72 at their forward ends (see Fig. 9). The sub-rails 71 serve to support the forward extremities of the bars 66 shown in Fig. 4, being extended forwardly and secured to the bars 66, and are also secured to the base bar 69 at their rear ends. The bars 66, 67, 68, 70 and 71 lie in a common plane positioned very near the ground.

In order to further brace the gathering arm skeleton, the bars 70, 71 and 68 are extended rearwardly and upwardly as at 73 and secured to the rear ends of the auxiliary rail 74 and of the rails 20 and to a short channel member 75, (Figs. 10 and 17), secured to a pair of brackets 73 suspended from the transverse channel 23, respectively. The auxiliary rail 74 is located on a level with the rails 20, is secured at its rear end to the transverse channel bar 23, and intermediate its ends to a second transverse channel bar 76a secured beneath the rails 20. Each of the channel bars 23 and 76a extend the full width of the gathering skeleton. A bracket 77 connects the forward end of the auxiliary rail 74 to the bar 70 for supporting that portion of the skeleton including the bars 67 and 70 (see Fig. 6).

Since very little lateral pressure will at any time be brought to bear against the bar 68, it is supported by its two connections, one with the base bar 69 and the other with the short channel member 75, which also serves to receive the end of the draw bar hereinafter to be described. It may be noted at this point that the rear transverse channel member 23 is positioned very near the transverse rail 34 and by engagement with the rail will serve to relieve the rails 20 of a great deal of the side strain to which they may at any time be subjected. At the same time, this engagement does not interfere with the sliding of the two frames relative to each other.

Having described the frame structure of my machine, I will now proceed to a detailed description of the

Gathering mechanism

Reference may now be had to Fig. 9. The structure formed upon the frame members 66 and 71 may be conveniently referred to as the inner gathering arms and the structure formed upon the frame members 67, 70 and 68, respectively, as the outer right and left gathering arms respectively. The inner gathering arms carry a complete set of gathering chains for all needs. To support these chains, I provide the lower, the intermediate, and the upper gathering chain tables 80, 81 and 82, respectively (Figs. 6 and 9). These tables are secured at their lower ends upon the skeleton bars 66 and 71 and are supported at their upper ends by brackets 83, 84 and 85, respectively (see Fig. 9). These brackets are all supported at their lower ends upon the rails 20 and their construction is thought to be obvious from the drawings. Upon the table 80 are journalled sprockets 86 and 87, (Fig. 9), between which may be placed, when desired, the chains 88 for gathering short of badly fallen corn. These chains will seldom be used but the sprockets are provided so that the chains may be attached when desired. Upon the tables 81 are mounted sprockets 89 and 90, between which travel the intermediate chains 91. Upon the tables 82 are mounted the sprockets 92 and 93, between which travel the upper chains 94 (Fig. 9).

A table 95, (Fig. 6), identical with the table 82, is mounted at its lower end upon the right outer gathering skeleton and at its upper end upon a bracket 96. Sprockets 97 and 98, mounted upon the table 95, carry a gathering chain 99 and sprockets 100 and 101, (Fig. 10), which are mounted on the forward end of the bar 68 and on a short table 102, carry the gathering chain 103 for the left outer gathering arm. The table 102 is supported by brackets 104 and 105 extending upwardly from the bar 68. It may be mentioned at this point that the table does not extend the entire length of the divider arm for the reason that it would interfere with the front right wheel of the tractor which pulls the machine, if allowed to do so. Braces 150, 151 and 105a brace the upper extremity of the left gathering arm (Fig. 1). The left gathering arm then comprises substantially only the bar 68 and a gathering chain.

Additional sprockets 106, (Fig. 1), carry the chains 94 and 99 around the bends in the central and right outer gathering arms. Guide plates 107 prevent the chains from contacting with the main frame of the gathering mechanism at its forward extremity. These plates are indicated in dotted lines in Fig. 1.

It will now be seen that for each corn row, there is a pair of upper gathering chains acting together to engage the corn and a single intermediate gathering chain acting on one side of the row.

I provide a plurality of flat steel spring strips 108, positioned above and below the chains 91 and 88, respectively, and adapted to resiliently urge the corn against these chains (Figs. 6 and 1). The strips 108 are secured at their lower ends to the skeleton bars 76 and 68, respectively. In order to sever the stalks from the rows, I provide, (see Fig. 4), a sickle bar 109, which carries a pair of knives 110. The sickle bar 109 is reciprocated by a pitman 111, which is journalled to a stud 112, secured to the bar 109, and at its other end to the pitman wheel 113 (Figs. 4, 9 and 17). The sickle bar 109 is preferably of spring steel which will not easily buckle. The sickle bar 109 is held against the base bar 69 by means of fingers 114, which are secured by bolts 115 and 116 threaded into the edge of the base bar and through blocks 117 into the upper surface thereof, respectively. Blocks 117 serve to receive the backward thrust upon the sickle bar (see Fig. 5). The cutting is done between the knives 110 and the end ledger plates 118, respectively.

For each pair of gathering arms, I provide a butt conveyor including generally a moving apron, inclined rearwardly and upwardly from a point just behind the sickle bar at an angle with that of the conveyor chains in order to attain the proper height for discharging to the transfer mechanism. Each butt conveyor comprises a table 119, supported at its lower end between the inclined portions 73 of the skeleton bars 70, 71 and 68, respectively (Figs. 9 and 6). At its upper end, each table 119 is secured to an angle iron 120, which, in turn, is supported by braces 121, serving the double function of supporting the angle iron 120 and bracing the intermediate regions of the structures 96, 84 and 105. The angle iron 120 serves to cross-brace the super-structure of the gathering mechanism at a point as far forwardly as it is possible to extend a frame member entirely across the machine, which point is just behind the elevating aprons.

An arch 122 is secured to and extends upwardly from the channel 23 and serves primarily to support the transfer trough 123. The arch is braced to the angle iron 120 by braces 124, which carry bearing brackets 125 and the gear housing 125a, in which is journalled the shaft 126. (See Figs. 6, 9 and 17.)

Rollers 127 are secured to the shaft 126 and idlers 128 are journalled between the skeleton bars 70, 71 and 71, 68, respectively. Between the rollers 127 and idlers 128, travel the elevator aprons 129, which are somewhat wider than the space between the bars 66 and 67. Guards 129a, (Figs. 9 and 4), protect the lower portions of the aprons 129 against contact with objects from below. Idlers 130 carry the lower reaches of the aprons sufficiently below the channel bar 76 and a drive chain, which will later be described.

This completes the detail of gathering mechanism, with the exception of the drive, which will later be described, and leads to the

*Transfer mechanism*

It is necessary to transfer the stalks of corn from an upright position moving in a longitudinal direction to a reclining position moving transversely to this original direction upon the conveyor belt of the cutting mechanism. In order to attain this, the corn must first be gathered from both of the pairs of gathering arms and guided into a continuous stream, such as may be handled by the single cutter apron. For the purpose of so collecting the corn, I provide the transfer chute, (Figs. 6 and 1), including the L shaped member 123, already described as being supported upon the arch 122, and the L shaped member 131, which is secured to a pair of posts 132 extending upwardly from the transverse rail 34. The vertical side of the trough 123 is cut away to receive the elevating aprons 129. The bottoms of the two respective trough members slide in contact with each other, the member 123 moving with the gathering frame and the member 131 remaining stationary with the cutter frame when the gathering frame is adjusted.

The posts 132 form part of a frame structure, (see Figs. 2 and 6), which supports the transfer chains. At their upper ends the posts 132 are connected by a cross bar 133 and braced by the diagonal braces 134 and central brace 135. The cross bar 133 extends beyond the posts 132 at its ends to support bearings 136, which journal the upper ends of the transfer chain shafts 137 and 138. The shafts 137 and 138 are journalled at their lower ends in boxings 139 secured to the rail 34. Sprockets 140 and 141, (Figs. 6, 2 and 1), are mounted upon the shafts 137 and 138 at their upper ends thereof, and just above the transfer trough, respectively. Transfer chains 142 and 143, respectively, travel on the sprockets 140 and 141. The direction of rotation of the shafts 140 is such as to cause the chains to travel in the direction indicated by the arrow 144, (Fig. 1), carrying the fodder toward the cutter head in the transfer trough and thence tending to swing through an arc of 90° around the shaft 138 over the cutter apron, which will hereinafter be described in detail. In order to guide the fodder around this turn, the trough member 131 is provided at its end with a curved side 145, and the guide fingers 146, secured to brackets 149, carried by the tables 81 and 82, respectively. The fingers 148 urge the fodder toward the transfer chains 142 and 143. Auxiliary fingers 150 are carried by a bracket 151 which extends vertically from the channel 23 to the table 102. (See Figs. 1 and 2.)

The vertical side of the trough member 123 extends beyond the curved end 14t of the trough member 131, as at 123a in Fig. 1, a distance sufficient to allow the sliding of the two trough members relative to each other without opening a gap in the continuous trough formed by the two members. The spring fingers 150 serve in the same way to close the tap between the gathering arm chains and the curved guide fingers 146 when the gathering mechanism is extended.

In order to feed the corn to the chains 142 and 143, when the gathering mechanism is extended, I provide the short feed chains 153, (Figs. 1, 6 and 17), traveling on sprockets 154, mounted on shafts 155 and 156, respectively, which in turn are journalled at their lower ends in a bearing 157 and the gear casing 125a, respectively (Fig. 17). The bearing 157 is carried by a bracket 158, secured to the angle iron 120. At their upper ends, the shafts 155 and 156 are journalled in bearings 159, (Fig. 2), supported by an angle bar 160, extending between the tables 82. Spring fingers 161, supported by a bracket 162 and on the strut 96, respectively, (Figs. 1, 2 and 6), are secured to the table 95, cooperate with the gathering chains and the feed chains 153 to carry the corn to the transfer chains.

Figures 20, 21:
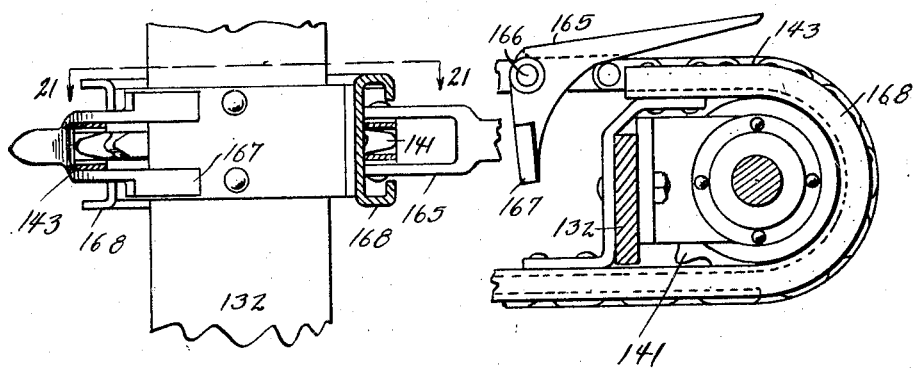
Fig. 20 is a detail, sectional view, taken on the line 20—20 of Fig. 2.
Fig. 21 is a detail, sectional view, taken on the line 21—21 of Fig. 20.

The cutter apron 163 moves in the direction indicated by the arrow 164 in Fig. 1. As the corn is deposited from the end of the transfer trough onto the cutter apron, the butts will be carried in the reverse direction to the direction of travel of the transfer chains. I therefore provide the lower transfer chains 143 with fingers, which will collapse during the travel of the chains in the reverse direction to the travel of the cutter conveyor (Figs. 20 and 21). To this end, the links 165 are pivoted at 166 to the chain 143 and are provided with follower blocks 167, which normally ride within the channel guides 168. The guides 168 are terminated during the outer reach of the chain and allow the fingers to pivot inwardly against the chain, releasing the butts of the fodder and allowing them to be carried rearwardly by the cutter conveyor. The upper chains 142 are provided with a guide 169, (Fig. 1), which is continuous during the entire length of the chain. Thus the upper ends of the fodder will be carried on with the transfer chains and the fodder will thereby be thrown to a reclining position upon the cutter conveyor, the butts being directed toward the cutting mechanism.

Having now completely described the transfer mechanism, I will proceed with a detailed description of the

Cutter

Secured to the inner faces of the rail 34 and 35, are plates 49, which form a housing for the cutter cylinder. A pair of self-aligning ball bearings 171 are secured to the plates 49 (Fig. 1), and the cutter shaft 172 is journalled in these bearings. To one end of the cutter shaft 172 is secured a universal joint 178, which has a socket 174, receiving the power transmission shaft 175. The power shaft 175 in turn is connected by a universal joint 176 to the power take-off shaft of the tractor. The cutter cylinder comprises a plurality of spiders 177, shaped at one end to form the flanges 178 and radial lugs 179 (Fig. 12). To the flanges 178 are secured knives 180, a bolt and slot connection 181 allowing circumferential adjustment of the blade and a set screw 182, threaded through each lug 179, serving to hold the adjustment of the blade. The cylinder just described is a well-known type of cutter cylinder and does not in itself form a part of my invention.

A shear plate 183 is secured by bolts 184 to the horizontal flanges of brackets 185, secured to the plates 49, the bolts 184 having a slotted connection with the flanges such as to allow the plate to be adjusted laterally. The shear plate 183 extends through elongated slots in the plates 170. A fixed shear plate 186 is immovably secured to the brackets 185 and provided with a set screw 187 which holds the adjustment of the movable shear plate 183.

The upper surface of the shear plate is exactly horizontal with the axis of the cylinder. It will be noted that the knives of the cylinder project forwardly from the radius to which they are perpendicular and consequently that a bevelled edge on the knives will be within the periphery of movement of their cutting ends.

The blades are sharpened to obtain this undercut while out of the machine. However, after once obtaining the proper bevel, the cutting edges may be retouched a number of times without re-bevelling the blades. In thus re-touching the cutting edges, I provide a built-in grinding unit, operated from the same power as the cylinder and consequently performing the grinding operation as the cylinder rotates. In so driving the wheel, the rate of rotation of the wheel is very much greater than that of the cutter cylinder and the rotation of the latter is throttled down to obtain the desired effect. The grinding wheel must be adjustable quickly toward the cutter cylinder and in order to obtain this adjustment without interfering with the drive to the wheel, I provide the following mounting for the wheel:

To the cross bar 63 of the auxiliary caster wheel mounting is secured an upwardly projecting post 188. A shaft 189 is supported in the bracket 188 and the plates 49 and swingingly mounted upon a shaft 189 is the grinding wheel frame comprising arms 190, a yoke 191, connecting the arms 190, and braces 192. Journalled in ball bearings 193, supported by the frame, is the wheel shaft 194, provided with a key slot 195 and carrying the wheel 196 which is keyed to the shaft. The wheel includes a carriage sleeve 197, to which the wheel is secured in the usual manner by a nut 198 and which is provided with an annular slot 199 to receive the forward end of a shifting lever 200. The shifting lever 200 is journalled at its other end for sliding movement upon a shaft 209, supported in the wheel frame. The shaft 201 serves merely to support the shifting lever in proper relation to the grinding wheel and the shifting lever offers a means for manually engaging the grinding wheel for shifting it from one end to the other of the cutter cylinder. In order to drive the grinding wheel, the fly wheel 202, secured upon the outer end of the cutter shaft 172 and serving primarily to store up the energy of the driving shaft and to absorb the shock of contact of each cutter knife with stalks of corn, is geared by a belt 203 to a belt pulley 204, journalled upon one end of the shaft 189. The pulley 204 is relatively small and is secured to, or formed integrally with, a much larger pulley 205, which in turn transmits power by a belt 206 to another small pulley 207, secured to the wheel shaft 194. The shaft 189 does not rotate and no journals are therefore provided for it. The shaft 194 rotates at a very high rate of speed and ball bearings are consequently used for this shaft. It will now be seen that as the grinder wheel frame swings about the shaft 189, the power transmitting mechanism will not be disturbed, due to the fact that it embodies a belt pulley secured to the same shaft. In order to definitely determine the adjustment of the grinding wheel toward the cylinder knives, I provide a link 208, (Fig. 3), pivoted at one end to an arm 190 and extending at its other end through a bracket 209, secured to the post 188 or plate 49, as the case may be, and adjusted relative to said bracket by means of nuts 210.

The fodder is fed toward the cutter cylinder by the apron 163 which comprises a plurality of slats secured to chains 211 traveling on sprockets 212 and 213, (Fig. 4), respectively, mounted on shafts 214 and 215, respectively. The shaft 214 is journalled in boxings 216, (Fig. 4), secured to the plates 49 and the shaft 215 is journalled in boxings 217, secured to brackets 218, which are pivoted at 219 to the rails 34 and 35, respectively, (Figs. 4 and 2). In order to tighten the conveyor apron, I provide tightening links 220, pivoted to the brackets 218 and extending through brackets 221, secured to the rails 34 and 35. Nuts 222 are threaded upon the ends of the links 220 and engage the brackets 221. Adjustment of the brackets 218 causes them to swing about their pivots 219.

The sprockets 212 are spaced somewhat from the shear plates 183 and 186 and a roller 223 is interposed therebetween. The roller 223 is mounted on a shaft 224 journalled in bearings 225, (Fig. 4), secured to the plates 49. The upper extremity of the roller 223 and of the apron 163 are positioned slightly above the shear plates in order that the corn may be smoothly fed over the plates. The roller 223 is used since it can be brought much closer to the shear plate than could the separated slats of the conveyor 63. The roller prevents the corn stalks becoming wedged between the shear plates and the feed apron.

In order to hold the corn down as close as possible to the shear plate, I provide a floating feed apron 227, (Figs. 1 and 12), mounted upon sprockets 228 and 229, respectively, secured to shafts 230 and 231, respectively. The shaft 230 is journalled in brackets 232, secured to the plates 49, (Fig. 14), and the shaft 231 has a floating mounting comprising the feeder frame 234, mounted within the apron 227 and between the sprockets 228 and 229. The weight of the frame and apron will maintain sufficient pressure against the corn feeding underneath the feeder and the feeder will raise and lower with the variation in quantity of corn passing through.

I provide an auxiliary feed roller 235, carried by a shaft 236, extending through a slot 237 in the plates 49, and journalled in a frame 238, which is swingingly mounted upon the shaft 230. The slot 237 is concentric with the shaft 230 and allows the roller to swing upwardly a distance of 5½ inches. It would be impossible to extend the feed apron 227 close enough to the cylinder to properly hold down the stalks without the danger of collision between the two, and the auxiliary feed roller 235, therefore, serves to hold down the stalks directly above the shear plate without danger of interference with the rotating blades. The shaft 236 is driven by a chain 239 traveling over sprockets 240 and 241 on the shafts 230 and 236, respectively.

A trough is formed for the conveyor 163 by a pair of plates 242, secured to the plates 49 at one end and to brackets 243 at the other end. The brackets 243 are supported from the rails 34 and 35 and carry just below the edges of the plates 242, fingers 244, (Fig. 6), which serve to support the lower end of a back plate 245. The upper end of the plate 245 is supported by a yoke 246 secured to the rails 34 and 35 (Fig. 2). The back plate 245 prevents corn being carried or thrown beyond the end of the conveyor 63.

The conveyor 163 is supported upon rollers 247, journalled between angle irons 248, which are supported by brackets 249, secured to the rails 34 and 35.

It will now be seen that as the corn is let down, in the manner already described, upon the conveyor 163, it will immediately be carried forward beneath the floating apron 227 and thence compressed above the shear plate as it is advanced into the knives of the cutter cylinder. The advance into the knives will be perfectly uniform, due to the horizontal direction of travel, the entire weight of the corn resting upon the apron and shear plate and the feeding being positively controlled by the travel of the apron.

After the corn has been chopped into bits by the rotating knives, it will drop through a chute 250 between the frame cross bars 38 and 37 to the

*Elevator*

A pair of depending brackets 54 are secured to the rails 34 and 35 and braced by means of diagonal brace 54a. The brackets 54 are connected by a cross-piece 252 at their lower ends and auxiliary brackets 253 are secured between the upper ends of the brackets 54 and the cross-piece 252, being spaced from the brackets 54, as shown in Fig. 15. The elevator comprises a pair of side members 254, connected by a bottom 255 and provided at its ends with shafts 256 and 257, on which are mounted sprockets 260a and 260b, respectively, between which travel the elevator chains 260 carrying elevator flights 261. The shaft 256 is journalled in bearings 262 secured to the outer faces of the sides 252, extending outwardly and normally received in slots 264, (Fig. 16), in the inner bracket members 263. The bearings 262 are held in place by pins 265 extended through lugs 266 and 267 on the bracket members 253.

One end of the shaft 256 is provided with a gear 269, (Fig. 15), which, when the elevator is in place, meshes with a pinion 270 freely mounted on a stud 271 carried between the bracket members 253 and 54. The pinion 270 is formed integrally with or secured to a sprocket 272 which serves to receive driving power for the elevator.

The projecting end of the elevator is supported by tie links 273, secured at one end to the elevator, as shown, and at the other end to posts 274, projecting upwardly from the plates 49 and braced by diagonal truss rods 275, extending to the upper ends of the posts.

The posts 274 serve as stops, against which the grinder wheel frame may be rested in an upwardly extending position, as shown in dotted lines in Fig. 2.

It is necessary to move the grinder frame to this position in order to allow the extension rails 47 to be swung to their dotted positions shown and hooks 276 are employed to engage the grinder wheel frame and support it in its inoperative position.

It will now be seen that the elevator may be instantly removed by lifting the pins 265 and sliding the bearings 262 from the slots 264, the pinion 270 and gear 269 rotating sufficiently to allow disengagement of their teeth. Thus the elevator may be removed and placed upon the conveyor 63 during transportation of the machine.

In order to drive the elevator, the grinder, the cutter, the conveyor, and feed aprons and the gathering mechanism, I provide the

Drive mechanism

Directions of rotation of parts are shown by arrows in the various views.

A portion of the drive has already been considered, from which it will be seen that the cutter cylinder is provided with a fly wheel, described, for evening the power and with a pair of sprockets 277 and 278 (Figs. 1 and 6). A power distributing shaft 279, (Figs. 6 and 19), is journalled in bearings 280 and 281, supported by a yoke-shaped bracket 282, carried by the rails 34 and 35 and at one end is provided with a pair of sprockets 283 and 284, aligned with the sprockets 277 and 278, respectively. The sprockets 283 and 284 are rotatably mounted relative to the shaft and are of different diameters in order to transmit power to the gathering mechanism at rates which vary in proportion to the rate of rotation of the cutter cylinder, and to coordinate the movement of the gathering mechanism with the speed of the tractor. The sprockets 284 and 283 are provided with integral clutch members 285 and a sliding clutch element 286 is splined to the shaft 279 to receive power from either of the clutch elements 285. A shifting lever 287 is extended through the bracket 282 and a shifting control rod 289 extends forwardly therefrom to a convenient point on the tractor.

Chains 500 and 501, (Figs. 1, 2 and 6), connect the sprockets 283 and 277 and the sprockets 284 and 278, respectively. The chain 501 travels over an idler 502, (Fig. 2), mounted on the frame member 61 to prevent contact with that member and the chain 500 travels over a large sprocket 503, which is mounted on a shaft 504, (Figs. 19 and 2), mounted in bearings 505 and 506, supported from the rails 35 and 34, respectively. The drive to the long conveyor 63 is taken from the shaft 504 through the medium of a clutch element 504, secured to the shaft and co-acting with a clutch element 508 on a sprocket 509, which is loosely mounted on the shaft 504. A clutch lever 510 engages the clutch element 508 through the medium of the clutch collar 511 and is pivoted to the rail 35. The lever 510 is connected by a control rod 512 to a convenient point of the tractor.

The sprocket 509 is geared to the shaft 214 by a large sprocket 513, (Fig. 2), against which the reverse side of a chain 514 engages. The chain 514 serves to drive both the shaft 213 and 230 and to give the correct direction of rotation to each of them. The roller shaft 224 is geared to the shaft 214 by sprockets 516 and 517 on the respective shafts, (Fig. 2), connected by a chain 518.

Figure 19:
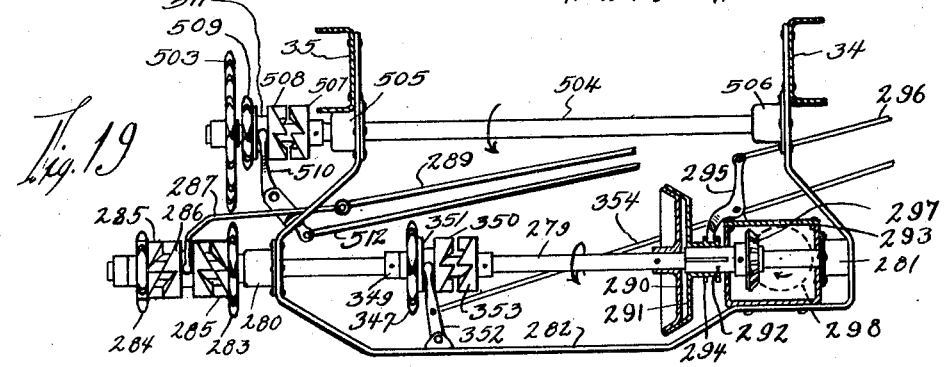
Fig. 19 is a detail, sectional view, taken on the line 19—19 of Fig. 4.

The other end of the distributing shaft 279 is provided with a friction clutch element 290, cooperating with a clutch element 291, splined for sliding movement on a sleeve 292, journalled in the gear housing 293, carried by the bracket 282, (Fig. 19). An annular clutch collar 294 is formed on the clutch element 291 and receives a clutch lever 295, pivoted to the box 293 and provided with a control rod 296, extending to a convenient position on the tractor. Within the gear box 293, the shaft 292 is provided with a bevelled gear 297, meshing with a bevel gear 298, on a transverse intermediate shaft 299 (Figs. 2 and 4). The shaft 299 is journalled at one end in the box 293 and at its other end in a bearing 300, (Figs. 2 and 6), supported by a bracket 201 from the rail 34 at its outer end. The shaft 299 is provided with a longitudinal key-way 302, (Fig. 4).

It will now be seen that the conveyor 63 may be thrown out entirely without disengaging the cutting or the gathering mechanism. For instance, at the end of the field, where there are only a few more hills to cut, the corn may be laid upon the feed apron and allowed to accumulate for a short distance while the machine is being turned to engage the next row and while the receiving wagon is being correctly postioned to begin the next row. If the wagon is full, an opportunity will thus be had to change wagons without wasting any of the fodder.

Should the cutter become clogged, the feed can be immediately stopped by disengaging the conveyor. Should the corn accumulate too rapidly in the gathering mechanism, the tractor may be stopped and the entire gathering mechanism thrown out by disengaging the clutch which controls the shaft 299. The feed apron will thus be allowed to carry away the surplus corn.

When changing wagons, the elevator is thrown out, in addition to the feed apron, to prevent spilling of the chopped corn.

A gear housing 303, (Fig. 18), is slidingly mounted on the shaft 299 by means of a bearing 304 at one end and a sleeve 305 at the other end, extending through a bearing 306.

Upon the inner end of the sleeve 305 is a bevel gear 307, meshing with a bevel gear 308 on the end of the pitman shaft 309, which is journalled at one end in the housing 303 and at its other end in a bearing 310, (Figs. 4 and 9), supported by a bracket 311 connecting the base bar 69 with one of the longitudinal rails 20. The pitman wheel 113 has already been described and is mounted upon the end of the shaft 309.

The sleeve 305 is keyed to the shaft 299 by a key sliding in the key-way 302 and at its outer end carries a sprocket 312, which serves to transmit power to the gathering mechanism with the exception of the sickle. The housing 303 is supported from the longitudinal rail 20 by means of a bracket 313, (Fig. 9), suspended from the longitudinal rail 20.

It will now be seen that as the gathering mechanism is adjusted transversely along the transverse frame, that the box 303 will be carried with it, sliding along the shaft 299 and retaining its driving connection therewith, thereby translating the drive for both sickle bar and gathering chains.

As has been previously mentioned, there are provided two full sets of gathering chains and two upper cooperating gathering chains. The full sets of chains are carried by the inner gathering arms, one of which is illustrated in Fig. 9, which is taken on the line 9—9 of Fig. 4. The upper sprockets 92 and 94 and 100, which drive the upper gathering chains on all gathering arms, are mounted on shafts 314, journalled in bearings 315 and 316, respectively, (Figs. 1 and 9), carried by plates 317, suspended upon brackets 318, by brackets 319, (Fig. 1), and by the gathering arm shields 82a, 102a and 95a, respectively, which cover and protect the chains carried by the tables 82 and 95, respectively. Drive sprockets 320 are secured to the shafts 394 and aligned with drive sprockets 321 on the chain drive shafts 322 and geared thereto by drive chains 321a. The shafts 322 are journalled in bearings 323, (Fig. 1), and gear housings 324. The bearings 323 are supported by the shields 82a and 95a. The housings 324 are mounted on plates 325, extended between the members 73. One of the gathering chain drive shafts is cut short at its lower end in order not to interfere with the draft tongue 326, which will hereinafter be described and is referred to by the character 322a. (Fig. 10.) The lower end of this shaft is supported by a bearing 327, carried by a bracket 328, supported on the channel member 76a. In order to drive this end shaft, I provide aligned sprockets 330 and 329 on the second shaft 322 and on the shaft 322a, connected by a drive chain 331, (Fig. 4). Thus the correct direction of rotation is obtained, the shafts on the left arms of the respective gathering arms rotating in the same direction. The lower chains of the inner gathering arms are driven directly from the shafts 322 by securing the sprockets 86 upon the said shafts. The intermediate gathering chains of the inner gathering arms are driven by mounting the sprockets 89 on shafts 332, journalled in bearings 333 and 334, secured to the tables 81 and 317, respectively. Sprockets 335 are carried by the upper ends of the shafts 332, (Fig. 1), and are driven by the chains 321a, which are held against the sprockets 335 by idlers 336.

The shafts 322 are driven from a connecting shaft 337, which is extended through one of the boxes 324 and which carries bevelled gears 338, (shown in dotted lines in Fig. 4), meshing with bevel gears 339 on the respective shafts 322. A sprocket 340 is secured to the shaft 337 in a position aligned with the sprocket 312 and is connected thereto by a chain 341. In order to drive the feed chains 153, I provide sprockets 342 and 343, (Fig. 11), on the shafts 337 and 126, respectively, which sprockets are aligned and connected by a drive chain 344. The shaft 156 is geared to the shaft 126 by means of bevel gears 345 and 346, (Fig. 17), on the respective shafts and encased in the gear housing 125a. Thus the shaft 126 serves not only to drive the butt elevator aprons 129, but also the feed chains as well.

The drive to the elevator comprises the sprockets 347 and 272, connected by a drive chain 348, (Figs. 2, 15 and 19). The sprocket 347 rides loosely on the shaft 292, being positioned against a collar 349 at one side and provided with a clutch element 350 and clutch collar 351 at its other side. A clutch lever 352 engages the collar 351 to move the clutch element 350 into engagement with a co-acting element 353. The lever 352 is pivoted to the yoke 282 and connected by a control rod 354 to a convenient point of the tractor.

The drive to the transfer chains is taken from the transverse shaft 299, through the medium of bevelled gears 355 and 356, (Fig. 2), on the shafts 299 and 138, respectively, the said bevel gears being contained in a housing 357, supported by brackets 358 to the short channel members 76 from the rail 34.

*Tractor hitch*

The biggest part of the load is transmitted directly in a forward direction to the draw bar of the tractor, through a hitch, which allows free vertical movement of the tractor and machine, relative to each other, while transmitting any turning movement of the tractor to the machine. The draw bar of the tractor is shown at 360 and the hitch includes a forward beam 361, secured to the draw bar 360 and provided with pairs of spaced loops 362, between which are secured pins 363. The swinging portion of the hitch comprises a pair of links 364, trussed together at 365 and receiving the pins 363 at one end. The other ends of the links 364 are looped to receive pins 366, carried by yoke-shaped members 367, secured between a pair of bars 368 and 369, which are spaced to receive the loops 370 secured to the rail 34. Vertical sliding or twisting movement of the hitch frame is obtained between the bars 368 and 369 and the loops 370 (Fig. 1a). The outer corner of the harvester frame is braced by a truss rod 371, connected at one end beneath the tractor and at its other end extended through a bracket 372, (Fig. 2), secured to the truss bar 64 and adjustably secured thereto by a threaded nut 373. The rod 371 carries a portion of the rear thrust against the outer end of the transverse frame of the machine. The tractor hitch is completed by the tongue 326, fulcrumed upon the cross beam 76a at 375 (Fig. 10), and extending forwardly to the body of the tractor where it is hitched by a floating tongue hitch comprising a plate 376, secured to the tongue plates 377, secured to the body 378 of the tractor and adjustable links 379 connecting the plates 377 and 376. The floating tongue hitch allows the tongue to swing vertically at its forward end as the vertical position of the tractor, relative to the machine, changes and the tongue may further swing up and down around the fulcrum 375, its rear end having a range of motion limited by the channel members 23 and 75, between which it is received.

The side channel members 76 prevent lateral movement of the rear end of the tongue and thus the tongue is allowed free vertical movement, relative to the machine while rigidly supporting the machine in a lateral direction against side draft.

The only side draft will be occasioned by the resistance of the corn stalks to the forward motion of the gathering arms. The pull of the gathering chains and the remainder of the operating mechanism is transmitted to the power shaft of the tractor entirely and no side draft is occasioned by this pull.

The advantages of the machine reside in arranging the cutting and gathering mechanism at right angles to each other behind and at the side of the tractor respectively, so that every portion of the machine will be as close as possible to the tractor and the draft, accordingly balanced as near as possible to the center of the tractor. Further advantages lie in the hitching means which provide flexibility between the tractor and the machine, in the means for folding the elevator and extension frame back upon the transverse portion of the machine, in the means for allowing quick adjustment of the gathering mechanism transversely of the machine, in the driving mechanism which allows such adjustment and also provides for individual control of the various portions of the operating mechanism, and in the built-in sharpening unit.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a machine of the class described, an L shaped frame, including longitudinal and transverse frame, adapted to be disposed, respectively, to one side of and directly behind, a tractor, gathering mechanism supported upon the longitudinal frame, cutting mechanism carried on the transverse frame, a draft hitch linking the transverse frame directly behind the tractor, and a guide hitch for linking the longitudinal frame to an intermediate portion of the tractor, said guide hitch including a longitudinal beam and a laterally extending member linking the tractor and beam together and free to swing vertically relative to both tractor and beam.

2. In a machine of the class described, an L shaped frame, including longitudinal and transverse frames, adapted to be disposed, respectively, to one side of and directly behind, a tractor, gathering mechanism supported upon the longitudinal frame, a cutting mechanism carried on the transverse frame, a draft hitch linking the transverse frame directly behind the tractor, and a guide hitch for linking the longitudinal frame to an intermediate portion of the tractor, said draft hitch including means for attaching to tractor and transverse frame so as to swing vertically relative to both.

3. In a machine of the class described, an L shaped frame, including longitudinal and transverse frames, adapted to be disposed, respectively, to one side of and directly behind, a tractor, gathering mechanism supported upon the longitudinal frame, cutting mechanism carried on the transverse frame, a draft hitch linking the transverse frame directly behind the tractor, and a guide hitch for linking the longitudinal frame to an intermediate portion of the tractor, said draft hitch including a vertically slidable connection with the transverse frame to allow pivotal movement on a longitudinal, horizontal axis.

4. In a machine of the class described, an L shaped frame, including longitudinal and transverse frames, adapted to be disposed, respectively, to the side of, and directly behind, a tractor, the longitudinal frame being adjustable lengthwise of the transverse frame, gathering mechanism supported upon the longitudinal frame, cutting mechanism supported upon the transverse frame, a power transmitting connection to be coupled directly between said cutting mechanism and a power unit on the tractor, a transversely arranged intermediate shaft carried by the transverse frame and driven from the cutting mechanism, a connecting shaft carried by the longitudinal frame in a position parallel to the intermediate shaft, a sprocket fixed to said connecting shaft, a sprocket slidably mounted upon the intermediate shaft and maintained in alignment with the fixed sprocket by a member fixed to the longitudinal frame, and a chain connecting said sprockets, the gathering mechanism being driven from said connecting shaft.

5. In a machine of the class described, an L shaped frame, including longitudinal and transverse frames, adapted to be disposed, respectively, to the side of, and directly behind, a tractor, the longitudinal frame being adjustable lengthwise of the transverse frame, gathering mechanism supported upon the longitudinal frame, cutting mechanism supported upon the transverse frame, a transversely arranged intermediate shaft carried by the transverse frame and driven from a power unit on the tractor, a connecting shaft carried by the longitudinal frame in a position parallel to the intermediate shaft, a sprocket fixed to said connecting shaft, a sprocket slidably mounted upon the intermediate shaft and in alignment with the fixed sprocket by a member fixed to the longitudinal frame, and a chain connecting said sprockets, the gathering mechanism being driven from said connecting shaft.

6. In a machine of the class described, an L shaped frame comprising longitudinal and transverse frames, adapted to be respectively disposed at one side of, and directly behind, a tractor, the transverse frame extending across the longitudinal frame, and removable elements securing said frames together in any of several adjusted positions.

7. In a machine of the class described, an L shaped frame comprising longitudinal and transverse frames, adapted to be respectively disposed at one side of, and directly behind, a tractor, each of said frames including a pair of parallel rails, the rails of the respective frames being crossed and in contact with each other, and removable elements securing said rails together at the points where they cross, a plurality of openings to receive said removable elements being provided in the transverse rails.

8. In a machine of the class described, an L shaped frame comprising longitudinal and transverse frames, adapted to be respectively disposed at one side of, and directly behind, a tractor, each of said rails including a pair of parallel rails, the rails of the transverse frame crossing those of the longitudinal frame and contacting with the faces of one side thereof, trusses secured to the transverse frame and having portions spaced therefrom and parallel thereto, said trusses contacting with the faces of the other side of the longitudinal frame, and removable elements securing said rails together at the points where they cross, a plurality of openings to receive said removable elements being provided in the transverse rails and in the trusses.

9. In a machine of the class described, an L shaped frame comprising longitudinal and transverse frames, adapted to be respectively disposed at one side of, and directly behind, a tractor, each of said frames including a pair of parallel rails, the rails of the respective frames being crossed and in contact with each other, and a gathering mechanism frame including a portion of said longitudinal frame, and including a transverse member secured to the longitudinal rails in a position resting substantially in contact with the forward face of the forward transverse rail, said transverse member extending substantially beyond the longitudinal rails, and removable elements securing said rails together at the points where they cross, a plurality of openings to receive said removable elements being provided in the transverse rails.

10. In a machine of the class described, an L shaped frame comprising longitudinal and transverse frames, adapted to be respectively disposed at one side of, and directly behind, a tractor, each of said frames including a pair of parallel rails, the rails of the respective frames being crossed and in contact with each other, a gathering mechanism frame including a portion of said longitudinal frame, and including a transverse member secured to the longitudinal rails in a position resting substantially in contact with the forward face of the forward transverse rail, said transverse member extending substantially beyond the longitudinal rails, and removable elements securing said rails together at the points where they cross, a plurality of openings to receive said removable elements being provided in the transverse rails, the rear portion of the longitudinal frame being offset upwardly and substantially contacting with the rear transverse rail at the offset, a travel wheel carried by the forward extremity of the longitudinal frame, and a caster wheel under said offset portion.

11. In an L shaped frame, including longitudinal and transverse frames, adapted to be disposed, respectively, to the side of, and directly behind a tractor, the longitudinal frame being adjustable lengthwise of the transverse frame, gathering mechanism supported upon the longitudinal frame, cutting mechanism supported upon the transverse frame, a power transmitting connection to be coupled directly between said cutting mechanism and a power unit on the tractor, a transversely arranged intermediate shaft carried by the transverse frame and driven from the cutting mechanism, a connecting shaft carried by the longitudinal frame in a position parallel to the intermediate shaft, a sprocket fixed to said connecting shaft, a gear housing carried by the longitudinal frame and slidably mounted on the intermediate shaft, a sleeve splined to the intermediate shaft, extending through one side of said housing, and carrying a bevel gear on its inner end and a sprocket on its outer end, a pitman shaft journalled at one end in the housing, and extending forwardly, said pitman shaft being provided with a bevel gear meshing with the bevel gear on the sleeve, a sprocket secured to the connecting shaft and aligned with the sprocket on the sleeve, and a chain connecting said sprockets.

12. In a machine of the class described, a longitudinal frame, gear housings supported below the longitudinal frame in inclined positions, chain drive shafts journalled in said housings and extending upwardly and forwardly, gathering arms supported upon the longitudinal frame, gathering chains thereon driven by said chain drive shafts, a butt elevator drive shaft carried by the longitudinal frame above said frame, a chain and sprocket connection between said butt elevator drive shaft and the connecting shaft, and butt elevators extending therefrom downwardly between the gathering arms.

13. In a machine of the class described, a longitudinal frame, gear housings supported below the longitudinal frame in inclined positions, chain drive shafts journalled in said housings and extending upwardly and forwardly, gathering arms supported upon the longitudinal frame, gathering chains thereon driven by said chain drive shafts, a butt elevator drive shaft carried by the longitudinal frame above said frame, a chain and sprocket connection between said butt elevator drive shaft, the connecting shaft, and butt elevators extending therefrom downwardly between the gathering arms and auxiliary feed chain shafts geared to said butt elevator drive shaft and extending upwardly therefrom.

14. In a machine of the class described, a longitudinal frame, gathering arms supported on said frame, inclined upwardly and rearwardly gathering chains supported on said frame, inclined upwardly and rearwardly, gathering chains supported by said arms to travel upwardly and rearwardly, a sickle base bar extending transversely below the frame, a sickle slidably mounted on a said base bar, a butt elevator mounted in the frame and extending upwardly and rearwardly at a steeper angle than the elevator chains, and a guard secured to the base bar and extending rearwardly under the butt elevator.

15. In a machine of the class described, a longitudinal frame, gathering arms supported on said frame, inclined upwardly and rearwardly, gathering chains supported by said arms to travel upwardly and rearwardly, a sickel extending transversely beneath the frame, a butt elevator mounted in the frame just rearwardly of the sickle and extending upwardly and rearwardly at a steeper angle than the elevator chains.

16. In a machine of the class described, an L shaped frame, including longitudinal and transverse frames, adapted to be disposed, respectively, to one side of and directly behind, a tractor, gathering mechanism supported upon the longitudinal frame, cutting mechanism carried on the transverse frame, transfer mechanism including a transversely arranged trough at the rear of the gathering mechanism, said trough being curved at its end to discharge at right angles to its length, and transfer chains travelling in line with said trough and around sprockets positioned above said curved portions, and a feed apron arranged parallel to said transfer chains, the latter being positioned between the trough and the apron.

17. In a machine of the class described, an L shaped frame, including longitudinal and transverse frames, adapted to be disposed, respectively, to one side of and directly behind, a tractor, gathering mechanism supported upon the longitudinal frame, cutting mechanism carried on the transverse frame, a feed apron carried by the transverse frame and transfer mechanism including a trough positioned transversely behind the gathering mechanism, and curved at its end to discharge upon the feed apron, and transfer chains positioned between the feed apron and the trough, the lower transfer chain being provided with fingers swingingly mounted on the chains, and guide channels arranged to maintain the fingers in an outstanding position while over the trough and to release the fingers while over the feed apron.

18. In a machine of the class described, an L shaped frame, including longitudinal and transverse frames, adapted to be disposed, respectively, to the side of, and directly behind, a tractor, the longitudinal frame being adjustable lengthwise of the transverse frame, gathering mechanism supported upon the longitudinal frame, cutting mechanism supported upon the transverse frame, a transversely arranged intermediate shaft carried by the transverse frame and driven from a power unit on the tractor, said shaft serving to transmit power to the gathering mechanism, a feed apron carried by the transverse frame, a trough positioned behind the gathering mechanism parallel to the transverse frame, and transfer chains carried by vertical shafts positioned between the feed apron and the trough, and carried by the transverse frame, one of said shafts extending downwardly to the intermediate shaft, and geared thereto.

19. In a machine of the class described, an L shaped frame, including longitudinal and transverse frames, adapted to be disposed, respectively, to the side of, and directly behind, a tractor, the longitudinal frame being adjustable lengthwise of the transverse frame, gathering mechanism supported upon the longitudinal frame, cutting mechanism supported upon the transverse frame, transfer chains carried by the transverse frame and travelling in a transverse direction, and a transfer trough positioned between said transfer chains and the gathering mechanism, comprising coacting trough portions carried by the transverse and longitudinal frames respectively.

20. In a machine of the class described, an L shaped frame, including longitudinal and transverse frames, adapted to be disposed, respectively, to one side of and directly behind, a tractor, duplicate sets of gathering mechanism carried on the longitudinal frame, cutting mechanism carried on the transverse frame, and transfer mechanism to collect material from the rear extremities of the gathering mechanisms, including transfer chains travelling in a transverse direction behind the gathering mechanisms, and spring fingers bridging the space between the gathering mechanisms and serving to urge the material against the transfer chains.

21. In a machine of the class described, an L shaped frame, including longitudinal and transverse frames, adapted to be disposed, respectively, to the side of, and directly behind, a tractor, the longitudinal frame being adjustable lengthwise of the transverse frame, gathering mechanism supported upon the longitudinal frame, cutting mechanism supported upon the transverse frame, and transfer mechanism including transfer, chains carried by the transverse frame and travelling in a transverse direction behind the gathering mechanism, and spring fingers secured to the outer extremity of the gathering mechanism frame, extending thence toward the transfer chains, and thence parallel to the chains, whereby to guide material to the chains when the gathering mechanism is in an extended position relative to the longitudinal frame.

22. In a machine of the class described, an L shaped frame, including longitudinal and transverse frames, adapted to be disposed, respectively, to the side of, and directly behind, a tractor, the longitudinal frame being adjustable lengthwise of the transverse frame, gathering mechanism supported upon the longitudinal frame, cutting mechanism supported upon the transverse frame, and transfer mechanism including transfer, chains carried by the transverse frame and travelling in a transverse direction behind the gathering mechanism, and spring fingers secured to the outer extremity of the gathering mechanism frame, extending thence toward the transfer chains, and thence parallel to the chains, whereby to guide material to the chains when the gathering mechanism is in an extended position relative to the longitudinal frame, and auxiliary feed chains positioned at the side of the gathering mechanism at its end, and opposite the transfer chains.

23. In a machine of the class described, an L shaped frame, including longitudinal and transverse frames, adapted to be disposed, respectively, to one side of and directly behind, a tractor, gathering mechanism supported upon the longitudinal frame, cutting mechanism carried on the transverse frame, a power shaft extending directly therefrom forwardly to be coupled to a power unit on the tractor, a distributor shaft carried by the transverse frame in a longitudinal position, a drive connection from said distributor shaft to the gathering mechanism, and a double drive from the cutting mechanism to the distributor shaft, including two driven elements loosely mounted on the distributor shaft adapted to transmit power at differing speeds thereto, and a single clutch element interposed between said elements and the distributor shaft.

24. In a machine of the class described, an L shaped frame, including longitudinal and transverse frames, adapted to be disposed, respectively, to one side of and directly behind, a tractor, gathering mechanism supported upon the longitudinal frame, cutting mechanism carried on the transverse frame, including a cutting cylinder, a power shaft extending directly therefrom forwardly to be coupled to a power unit on the tractor, a feed apron carried by the transverse frame, a distributor shaft carried by the transverse frame in a longitudinal position, a drive connection from said distributor shaft to the gathering mechanism, a chain drive from the cutter to the distributor shaft, and a reduction sprocket geared to the feed apron and driven by said chain.

25. In a machine of the class described, an L shaped frame, including longitudinal and transverse frames, adapted to be disposed, respectively, to one side of and directly behind, a tractor, gathering mechanism supported upon the longitudinal frame, cutting mechanism carried on the transverse frame, including a cutting cylinder, a power shaft extending directly therefrom forwardly to be coupled to a power unit on the tractor, a feed apron carried by the transverse frame, a distributor shaft carried by the transverse frame in a longitudinal position, a drive connection from said distributor shaft to the gathering mechanism, a chain drive from the cutter to the distributor shaft, a reduction sprocket geared to the feed apron and driven by said chain, and a clutch interposed between the reduction sprocket and the feed apron.

26. In a machine of the class described, an L shaped frame, including longitudinal and transverse frames, adapted to be disposed, respectively, to one side of and directly behind, a tractor, gathering mechanism supported upon the longitudinal frame, cutting mechanism carried on the transverse frame, including a power shaft extending directly therefrom forwardly to be coupled to a power unit on the tractor, a feed apron carried by the transverse frame, a floating apron above said feed apron, a distributor shaft carried by the transverse frame in a longitudinal position, a drive connection from said distributor shaft to the gathering mechanism, a chain drive from the cutter to the distributor shaft, drive sprockets for the feed apron and floating apron, respectively, and a chain passing over said drive sprockets and driven from the distributor shaft drive chain through an intermediate sprocket connection.

27. In a machine of the class described, an L shaped frame, including longitudinal and transverse frames, adapted to be disposed, respectively, to one side of and directly behind, a tractor, gathering mechanism supported upon the longitudinal frame, cutting mechanism carried on the transverse frame, including a power shaft extending directly therefrom forwardly to be coupled to a power unit on the tractor, a feed apron carried by the transverse frame, a floating apron above said feed apron, a distributor shaft carried by the transverse frame in a longitudinal position, a drive connection from said distributor shaft to the gathering mechanism, a chain drive from the cutter to the distributor shaft, drive sprockets for the feed apron and floating apron, respectively, a chain passing over said drive sprockets and driven from the distributor shaft drive chain through an intermediate sprocket connection, and a clutch interposed between said chains.

28. In a machine of the class described, an L shaped frame, including longitudinal and transverse frames, adapted to be disposed, respectively, to one side of and directly behind, a tractor, gathering mechanism supported upon the longitudinal frame, cutting mechanism carried on the transverse frame, including a power shaft extending directly therefrom forwardly to be coupled to a power unit on the tractor, a feed apron carried by the transverse frame, a floating apron above said feed apron, a distributor shaft carried by the transverse frame in a longitudinal position, a drive connection from said distributor shaft to the gathering mechanism, a chain drive from the cutter to the distributor shaft, drive sprockets for the feed apron and floating apron, respectively, an intermediate reduction sprocket driven from said chain, a small sprocket driven from said reduction sprocket, a clutch for connecting the said last mentioned sprockets, and a chain connecting the small sprocket with the respective drive sprockets for the aprons.

29. In a machine of the class described, an L shaped frame, including longitudinal and transverse frames, adapted to be disposed, respectively, to one side of and directly behind, a tractor, gathering mechanism supported upon the longitudinal frame, cutting mechanism carried on the transverse frame, a power shaft extending directly therefrom forwardly to be coupled to a power unit on the tractor, a distributor shaft, carried by the transverse frame in a longitudinal position and geared to the cutting mechanism, an elevator carried by the transverse frame at its end, extending outwardly therefrom in a transverse direction, said elevator having a separable connection with the transverse frame and being provided with a drive gear, a drive pinion carried by the transverse frame in position to mesh with said gear, and a driving connection between the pinion and the distributing shaft.

30. In a machine of the class described, an L shaped frame, including longitudinal and transverse frames, adapted to be disposed, respectively, to one side of and directly behind, a tractor, gathering mechanism supported upon the longitudinal frame, cutting mechanism carried on the transverse frame, an elevator carried by the transverse frame at its end and projecting therebeyond, a swinging extension frame hinged to the transverse frame and embracing said elevator, a removable caster wheel supporting the end of said swinging frame, the latter frame being movable to a substantially vertical position and the elevator being removable, and means to receive the caster wheel so as to connect it directly to the transverse frame.

31. In a machine of the class described, an L shaped frame, including longitudinal and transverse frames, adapted to be disposed, respectively, to one side of and directly behind, a tractor, gathering mechanism supported upon the longitudinal frame, cutting mechanism carried on the transverse frame, an elevator carried by the transverse frame at its end and projecting therebeyond, a swinging extension frame hinged to the transverse frame and embracing said elevator, a removable caster wheel supporting the end of said swinging frame, the latter frame being movable to a substantially vertical position and a swinging brace pivoted at one end to the transverse frame and attachable at its other end to the swinging frame in either of its positions.

32. In a machine of the class described, an

L shaped frame, including longitudinal and transverse frames, adapted to be disposed, respectively, to one side of and directly behind, a tractor, gathering mechanism supported upon the longitudinal frame, cutting mechanism carried on the transverse frame, a draft hitch linking the transverse frame directly behind the tractor, and a guide hitch for linking the longitudinal frame to an intermediate portion of the tractor, including a tongue fulcrumed intermediate its length to the longitudinal frame and engaged at its rear end for limited vertical swinging.

Signed this 23rd day of March, 1927, in the county of Woodbury and State of Iowa.

CHARLES W. EYRES.